United States Patent Office 3,393,157
Patented July 16, 1968

3,393,157
PROCESS OF POLYMERIZING CYCLIC ETHERS
AND/OR CYCLIC ACETALS
Paul Janssen, Cologne, Paul Riegger, Bonn, and Hermann
Richtzenhain and Wilhelm Vogt, Cologne-Sulz, Germany, assignors to Dynamit Nobel Aktiengesellschaft,
Troisdorf, Bezirk Cologne, Germany, a corporation of
Germany
No Drawing. Filed Feb. 19, 1964, Ser. No. 346,023
Claims priority, application Germany, Feb. 20, 1963,
D 40,939
18 Claims. (Cl. 260—2)

ABSTRACT OF THE DISCLOSURE

There is disclosed a process for polymerizing cyclic ethers and/or cyclic acetals to produce polymeric materials not exclusively composed of oxymethylene groups. Specifically a cyclic ether having the formula:

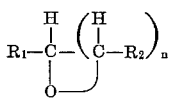

wherein $R_1$ and $R_2$ are each alkyl, cycloalkyl, aryl, alkoxy or aryloxy and $n$ has a value of 1 to 4, or a cyclic acetal having one of the following formulae

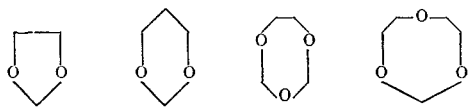

or a mixture of any of the cyclic ethers and/or acetals among themselves or with a cylic acetal having the formula:

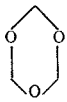

is polymerized in the presence of a catalyst consisting of $SO_3$.

---

This invention relates to a new process for the polymerization of cyclic ethers and/or cyclic acetals. More particularly, this invention relates to a new process for the polymerization of cyclic ethers and/or cyclic acetals to produce polymeric materials not exclusively composed of oxymethylene groups.

The polymerization of cyclic ethers such as tetrahydrofuran in the presence of $BF_3$ or $BF_3$ complex compounds to form polyethers is well known. It has also already been proposed to polymerize cyclic acetals, such as trioxane, in the presence of $BF_3$ or complexes thereof to produce thereby high molecular polyoxymethylenes. Additionally, it has also been suggested to produce copolymers of cyclic ethers and cyclic acetals by a copolymerization effected in the presence of $BF_3$ or its complex compounds.

In United States patent application Ser. No. 237,737, filed Nov. 14, 1962, a method for economically producing high-molecular polyoxymethylenes by the polymerization of trioxane in the presence of $SO_3$ has been described.

This invention has as an object a new and improved method for the polymerization of cyclic ethers and/or acetals.

Another object of the invention is the provision of a method whereby the polymerization of cyclic ethers and/or acetals can be effected at a practicable rate.

Another object of the invention is the preparation of polymeric materials from cyclic ethers and/or cyclic acetals which are not exclusively composed of oxymethylene groups.

Other objects will appear hereinafter.

These objects are accomplished by the present invention wherein a polymerizable cyclic ether, cyclic acetal or mixture thereof is polymerized in the presence of $SO_3$ as polymerization catalyst.

The cyclic ethers used as starting compounds have the following formula:

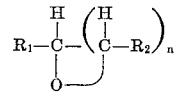

wherein $n$ is a whole number from 1 to 4 and $R_1$ and $R_2$ are each a member of the group consisting of hydrogen, alkyl, cycloalkyl, aryl, alkoxy, and aryloxy radicals.

The above formula includes, for example, compounds having 1,2-epoxy groups, such as ethylene oxide, propylene oxide, epichlorhydrin, cyclohexene oxide, styrene oxide, glycide ethers and the like, compounds having 1,3-epoxy groups, such as oxacyclobutane or 3,3-dichlormethyloxacyclobutane, tetrahydrofuran and its derivatives, and tetrahydropyran and its derivativees. In addition, bicyclic ethers in which the radicals $R_1$ and $R_2$ are joined together to form a common ring, such as 1,4-epoxycyclohexane, can be polymerized in the process of the invention. Furthermore, diepoxy compounds can be polymerized in accordance with the process of the present invention. Their use, however, is limited for practical purposes to employment as comonomers in small amounts because of the cross-linking effects produced by their presence.

The cyclic acetals which are suitable for use in accordance with the invention include the compounds having the following formula

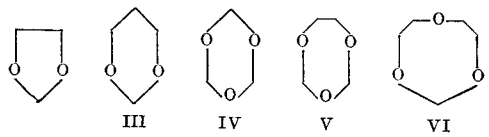

Illustrative of the cyclic acetals of Formula II are 1,3-dioxolane, 2-methyl-1,3-dioxolane, 2,2-pentamethylene-1, 3-dioxolane, 2,4-dimethyl-2-ethyl-1,3-dioxolane, 2-trichloromethyl-1,3-dioxolane, 2-methoxy-1,3-dioxolane, 2-phenyl - 1,3 - dioxolane. The cyclic acetals of Formula III which can be used, include, for example, 1,3-dioxane, 4-methyl-1,3-dioxane, 4,4-dimethyl-1,3-dioxane, 4,4-dichloromethyl-1,3-dioxane. Suitable instances of cyclic acetals corresponding to Formula IV are trioxane in which the hydrogen atoms of the methylene groups can be replaced by alkyl groups, chloroalkyl groups or alkoxyalkyl groups having 1 to 3 carbon atoms. Trioxane itself is suitable particularly as a comonomer for copolymerization with cyclic ethers and/or other cyclic acetals.

An instance of a cyclic acetal corresponding to Formula V, suitable for use in the polymerization process of the invention, is 1,3,5-trioxacycloheptane, and of a cyclic acetal, corresponding to Formula VI, is the formal of diethylene glycol.

The use of $SO_3$ as a polymerization catalyst requires that the monomers or mixtures have a very high degree of purity. In particular, contamination of the monomers by compounds containing OH groups, such as for example water or alcohol produces markedly detrimental effects on the polymerization, even when such contaminants are present in minor amounts.

The polymerization or copolymerization can be carried out in the absence of any solvent, or, alternatively, in the present of a solvent or diluent. Additionally, the polymerization of copolymers can be effected in the gaseous phase. Depending on the nature of the polymerization, i.e., whether there is present a solvent or whether the polymerization is conducted in the gaseous phase, sulfur trioxide can be added in the form of its solution or in its gaseous form.

The quantity of sulfur trioxide to be employed in the polymerization amounts to from $10^{-4}$ to 5 mol percent, and preferably from $10^{-3}$ to 1 mol percent.

The solvents which are suitable for use in the process in accordance with the invention include saturated chlorinated hydrocarbons, preferably 1,2-dichloro ethane, which is particularly suitable as a solvent for the sulfur trioxide. Aliphatic and alicyclic hydrocarbons or mixtures thereof, as for example, pentane, hexane, cyclohexane, light gasoline, gasoline or saturated chlorinated hydrocarbons, such as, for instance, methylene chloride, chloroform, carbon tetrachloride, 1,2-dichlorethane, etc., are suitable as solvents or diluents for the monomers. Where the polymerization reaction is a gas phase polymerization, the sulfur trioxide is added to the monomer or monomers in gaseous form, preferably after dilution thereof with an inert gas, such as, for example, nitrogen.

The process of the invention can be carried out over a very wide temperature range. The range of suitable temperatures varies from −80 to 150° C. and preferably the polymerization is carried out at a temperature of between 0 and 100° C.

The polymers or copolymers produced by the process of the invention are obtained in a form varying from an oil of low viscosity to a solid of high molecular weight, depending upon the monomeric starting materials, the amount of catalyst, and the conditions of the reaction.

The polymeric materials produced are suitable for many applications per se as plasticizers and as lubricants, and as intermediates in the manufacture of plastics, and again, per se, as plastics characterized by thermoplastic properties.

The following examples are given as illustrations and not as limitations of the invention:

Examples 1 to 6

The polymerization in each instance was conducted in a sealed glass flask flushed with nitrogen (introduced through a long capillary tube) under exclusion of moisture. The catalyst was a solution of 5% by weight $SO_3$ in dichloroethane. In these instances as in every other case, the solvent used was absolutely dry and substantially free of any unsaturated compounds.

The catalyst and the substance to be polymerized were intimately mixed by stirring. Each example was carried out with 50 g. of material to be polymerized, and the flask contents in each instance were allowed to stand for 24 hours at room temperature. The results are shown in the following table:

TABLE I

| Ex. | Substance | 5 wt. percent SO₃ solution (1 ml.=0.1 mol percent) | Polymer |
| --- | --- | --- | --- |
| 1 | 1,3-dioxane | 1.1 | Colorless, highly viscous solution. |
| 2 | Epichlorhydrin | 0.9 | Colorless solution of low viscosity. |
| 3 | 2-phenyl-1,3-dioxane | 0.5 | Viscous, clear solution. |
| 4 | 4,4-dimethyl-1,3-dioxane. | 0.8 | Waxy. |
| 5 | Diethyleneglycol-formal. | 0.8 | Rubbery, clear product. |
| 6 | 3,3-dichloromethyl-cyclooxabutane. | 0.5 | Solid product, insoluble in water, alcohol, ether, hydrocarbons; soluble in boiling dimethylformamide. |

Example 7

30 g. diethyleneglycolformal, 20 g. 3,3-dichloromethyl cyclo-oxabutane and 0.7 ml. of 5 wt. percent $SO_3$ solution in dichloroethane in a nitrogen atmosphere were mixed at room temperature in a glass flask provided with an agitator. Following about 2 hours, the solution became so viscous that the agitation had to be discontinued. After 24 hours, the polymer, which was now solid, was crushed and then boiled with a 2% solution of ethanolamine in methanol to separate the catalyst. The yield of polymer amounted to 68%. The chlorine content of the polymer was 19.8%.

Example 8

A blower was employed to drive a stream of dry nitrogen gas in continuous circulation from the bottom to the top of a vertical, cylindrical, double-walled vessel having a volume of 150 liters, a diameter of 400 mm., the bottom quarter portion of which was tapered funnel-wise and equipped with a discharge worm. The nitrogen gas line, having a diameter of 50 mm. and a length of 5 liters, was heated to 60° C., while the cylinder wall was cooled, whereby an internal temperature of about 45° C. was maintained over about two-thirds of the vertical reactor. The reactor wall was kept free of polymer by means of a rotating scraper.

The gas velocity in the reaction chamber was adjusted to about 1 meter per second, resulting in a flow velocity of 60 meters per second in the nitrogen gas line.

The polymerization was carried out as follows: A proportioning pump was used to feed a solution, heated to 65° C., of 27 g. 1,3-dioxane (3 mol percent) in 873 g. trioxane per hr., into an evaporator which was connected on the suction side to the nitrogen gas line. $SO_3$ was continually dripped into a second evaporator and was fed from this evaporator in gaseous form to the nitrogen line at a rate of 1.8 g. per hr. (0.225 mol percent). The polymer which formed was removed from the reactor through the discharge worm and made into a paste using a 5% ammonia solution. The resulting paste was thereafter finely ground in a ball mill. The paste was heated in an autoclave for 30 minutes at 100° C. after the addition thereto of methanol in an amount of one-half of the volume of the paste. The polymer thus produced was first washed to neutrality with water, thereafter with acetone, and dried under vacuum at 60° C. The polymer which was recovered in a yield of 73% had a reduced viscosity of 3.1. The reduced viscosity $[\eta]_{red}$ was measured in the Höppler Viscosimeter using a solution of 0.5 wt. percent polymer in p-chlorophenol to which 2 wt. percent of α-pinene had been added at a temperature of 60° C.

Example 9

Example 8 was repeated under modified conditions whereby the polymerization was carried out in a turbulent layer. To this end the arrangement in Example 8 was modified so that, instead of the external cooling, a cooler having a wall surface area of 2 sq. m. was installed in the reactor, and the discharge worm was fed from an overflow tube at a point two-thirds of the reactor height. The scaper was eliminated. The polymerization conditions as regards temperature and gas velocity remained unchanged. 900 g. trioxane and 1.8 g. sulfur trioxide were fed per hour into the reactor under nitrogen, as described above. Additionally, a current of 11 liters per hr. of ethylene oxide (5 mol percent) was charged to the polymerization. The polymer was further processed as set out in Example 8. The yield of polymer amounted to 68%. The polymer had a reduced viscosity of 2.7.

Examples 10–15

In the following examples, solvents and co-monomers in the amounts as listed in the following table were added in each instance to 90 g. trioxane which had been recrystallized from methylene chloride and introduced into a 3-necked flask provided with an agitator and reflux condenser. Care was taken to exclude air and moisture. The polymerization was carried out in a nitrogen atmosphere. Heat was applied until a clear solution was obtained and thereafter 2.4 ml. (0.15 mol percent) of a solution of 5% by weight sulfur trioxide in 1,2-dichloroethane or carbon tetrachloride were added and the mixture cooled until crystallization occurred. The polymer formed immediately as a white precipitate. After 30 minutes, the polymerization mixture was again heated to 65° C. and re-cooled. Thereafter 100 ml. of a solution of 2 wt. percent ethanolamine in methanol was added to the polymer and it was finely ground in a Block-Rosetti ball mill. The ground product was heated to 100° C. in an ammonia solution after the addition of methanol thereto, as described in Examples 1–6 above. The results are as follows:

TABLE II

| Ex. No. | Cyclohexane, ml. | Comonomer, 4 mol percent | Yield, percent | [η] Red |
|---|---|---|---|---|
| 10 | 87 | 1,3-dioxolane (2.96 g.) | 81 | 3.2 |
| 11 | 86.5 | 2-methyl-1,3-dioxolane (3.5 g.) | 69 | 2.9 |
| 12 | 85.9 | 2,2-dimethyl-1,3-dioxolane (4.1 g.) | 72 | 2.7 |
| 13 | 85.4 | 2-methyl-2-ethyl-1,3-dioxolane (4.6 g.) | 65 | 3.6 |
| 14 | 84.3 | 2,2-pentamethylene-1,3-dioxolane (5.7 g.) | 68 | 2.4 |
| 15 | 84.8 | 2,4-dimethyl-2-ethyl-1,3-dioxolane (5.2 g.) | 63 | 3.1 |

Example 16

In accordance with the procedure set out above (Examples 10–15) 90 g. trioxane were polymerized in 100 ml. light gasoline (B.P. 80–110° C.) with 5 mol. percent (5.9 g.) diethyleneglycolformal, in the presence of 4.8 ml. of 5 wt. percent solution $SO_3$ in carbon tetrachloride. The polymer was further processed as set out in the preceding examples. In place of the ammonia solution a 3 wt. percent solution of sodium methylate in methanol was used. The polymer, which was thus produced in a yield of 85% has a reduced viscosity of 3.2.

Example 17

2.4 ml. of a solution of 5 wt. percent $SO_3$ in carbon tetrachloride and 2.2 g. (2.5 mol percent) 1,3-dioxane were added under nitrogen to 90 g. trioxane in 135 ml. cyclohexane in an autoclave provided with a stirring apparatus. After the autoclave was sealed, it was heated to 65° C. and cooled in the course of 30 minutes to 35° C. This procedure was repeated twice. The purification of the polymer was conducted as described in Example 3 above. The polymer thereby obtained had a reduced viscosity of 3.4 and was recovered in a yield of 81%.

Example 18

Example 13 was repeated but, in place of 1,3-dioxane, 2.3 g. (2.5 mol percent) epichlorhydrin were used. The yield of polymer amounted to 76% and at a reduced viscosity of 2.9. The chlorine content was 0.63%.

Example 19

In a sealed vessel 50 g. trioxane were mixed with 2.5 g. epichlorhydrin and 0.2 ml. of a 5 wt. percent solution of $SO_3$ under nitrogen. After 10 hours at 80° C., a solid reaction mass was obtained, which was processed as described in Example 8. The polymer was obtained in a 91% yield at a viscosity of 1.4 and a chlorine content of 1.6% (theoretical 1.83%).

We claim:

1. In the manufacture of polymerization products by the catalytic polymerization of a monomer selected from the group consisting of (1) cyclic ethers having the following formula:

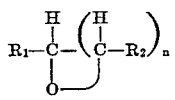

wherein $R_1$ and $R_2$ are each a member selected from the group consisting of alkyl, cycloalkyl, aryl, alkoxy and aryloxy and $n$ is a whole number from 1 to 4, (2) cyclic acetals having the following formulae

   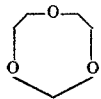

(3) mixtures thereof, (4) and mixtures thereof with cyclic acetals having the formula:

the improvement of polymerizing the monomer in the presence of a polymerization catalyst consisting of $SO_3$ in an amount of from $10^{-4}$ to 5 mol percent at a temperature of from about −80 to 150° C. for a period of time sufficient to polymerize the monomer and to produce a polymeric material not exclusively composed of oxymethylene groups.

2. Improvement according to claim 1, wherein said polymerizing is effected at a temperature of from 0 to 100° C.

3. Improvement according to claim 1, wherein said polymerizing is effected with the catalyst present in an amount of from about $10^{-3}$ to 1 mol percent.

4. Improvement acording to claim 1, which comprises the method of polymerizing in the presence of a solvent for the $SO_3$.

5. Improvement according to claim 4, wherein said solvent is a saturated chlorinated hydrocarbon.

6. Improvement according to claim 5, wherein said solvent is 1,2-dichloroethane.

7. Improvement according to claim 1, which comprises effecting the polymerizing in the presence of a solvent for the monomer.

8. Improvement according to claim 7 wherein said solvent is a member selected from the group consisting of aliphatic hydrocarbons, alicyclic hydrocarbons, saturated chorinated hydrocarbons, and mixtures thereof.

9. Improvement according to claim 1, which comprises effecting said polymerizing in an inert atmosphere.

10. Improvement according to claim 9, which comprises effecting said polymerizing in the presence of nitrogen.

11. Process for manufacturing polymerization products not exclusively composed of oxymethylene groups by catalytically polymerizing a monomer selected from the group consisting of (1) cyclic ethers having the following formula:

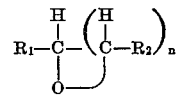

wherein $R_1$ and $R_2$ are each a member selected from the group consisting of alkyl, cycloalkyl, aryl, alkoxy and aryloxy and $n$ is a whole number from 1 to 4, (2) cyclic acetals having the following formulae

   

(3) mixtures thereof, (4) and mixtures thereof with cyclic acetals having the formula:

which comprises mixing such a monomer with a polymerization catalyst consisting of $SO_3$ in an amount of from about $10^{-4}$ to 5 mol percent, polymerizing the monomer in the presence of the catalyst of the catalyst at a temperature of from about −80 to 150° C. for a period of time sufficient to polymerize the monomer and to produce a poylmeric material not exclusively composed of oxymethylene groups.

12. Process according to claim 11, which comprises effecting said polymerizing at a temperature of from about 0 to 100° C.

13. Process according to claim 11, which comprises effecting said polymerizing with an amount of catalyst of from about $10^{-3}$ to 1 mol percent.

14. Process according to claim 11, wherein said monomer is a member selected from the group consisting of 1,3-dioxane, epichlorhydrin, 2-phenyl-1,3-dioxane, 4,4-dimethyl-1,3-dioxane, diethyleneglycolformal, and 3,3-dichloromethylclyclooxabutane.

15. Process according to claim 11, wherein said group member is a mixture of diethyleneglycolformal and 3,3-dichloromethylclyclooxabutane.

16. Process according to claim 11, wherein said group member is a mixture of 1,3-dioxane and trioxane.

17. Process according to claim 11, wherein said group member is a mixture of trioxane with a member selected from the group consisting of 1,3-dioxolane, 2-methyl-1,3-dioxolane, 2,2-dimethyl-1,3-dioxolane, 2-methyl-2-ethyl-1,3-dioxolane, 2,2-pentamethylene-1,3-dioxolane and 2,4-dimethyl-2-ethyl-1,3-dioxolane.

18. A polymerizable composition consisting essentially of a mixture of a member selected from the group consisting of (1) cyclic ethers having the following formula:

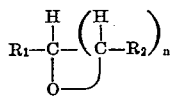

wherein $R_1$ and $R_2$ are each a member selected from the group consisting of alkyl, cycloalkyl, aryl, alkoxy and aryloxy and $n$ is a whole number from 1 to 4, (2) cyclic acetals having the following formulae

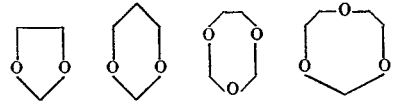

(3) mixtures thereof, (4) and mixtures thereof with cyclic acetals having the formula:

with a polymerization catalyst consisting of $SO_3$ in an amount of from about $10^{-4}$ to 5 mole percent.

References Cited

UNITED STATES PATENTS

| | | | |
|---|---|---|---|
| 3,027,352 | 3/1962 | Walling et al. | 260—20 |
| 3,297,642 | 1/1967 | Richtzenhain | 260—20 |
| 2,891,837 | 6/1959 | Campbell | 260—20 |

WILLIAM H. SHORT, *Primary Examiner.*

SAMUEL H. BLECH, *Examiner.*

T. PERTILLA, *Assistant Examiner.*